(12) United States Patent  
Wada et al.

(10) Patent No.: US 8,315,292 B2  
(45) Date of Patent: Nov. 20, 2012

(54) COMMUNICATION APPARATUS

(75) Inventors: Hirofumi Wada, Osaka (JP); Naoto Kii, Osaka (JP)

(73) Assignee: Panasonic Corporation, Osaka (JP)

( * ) Notice: Subject to any disclaimer, the term of this patent is extended or adjusted under 35 U.S.C. 154(b) by 824 days.

(21) Appl. No.: 11/405,449

(22) Filed: Apr. 18, 2006

(65) Prior Publication Data

US 2006/0239693 A1    Oct. 26, 2006

(30) Foreign Application Priority Data

Apr. 22, 2005  (JP) ................................. 2005-124659  
Apr. 6, 2006   (JP) ................................. 2006-105081

(51) Int. Cl.  
*H04B 1/38* (2006.01)

(52) U.S. Cl. ......... 375/219; 375/246; 375/239; 375/238

(58) Field of Classification Search .................. 375/219, 375/246, 239  
See application file for complete search history.

(56) References Cited

U.S. PATENT DOCUMENTS

| | | | |
|---|---|---|---|
| 4,242,664 A | | 12/1980 | Lindstedt et al. |
| 4,288,823 A | * | 9/1981 | Yamamoto et al. ........ 360/73.05 |
| 4,323,976 A | * | 4/1982 | Radaelli et al. .............. 702/147 |
| 4,958,069 A | * | 9/1990 | Okamori ................... 250/223 R |
| 5,210,846 A | | 5/1993 | Lee |
| 5,398,326 A | | 3/1995 | Lee |
| 5,621,758 A | * | 4/1997 | Suzuki et al. ................. 375/238 |
| 6,118,393 A | * | 9/2000 | Chiba et al. ..................... 341/61 |
| 2002/0075973 A1 | * | 6/2002 | Charrat ......................... 375/340 |

FOREIGN PATENT DOCUMENTS

| | | |
|---|---|---|
| JP | 54-035576 A | 3/1979 |
| JP | 61-125259 A | 6/1986 |
| JP | 09-214581 A | 8/1997 |

OTHER PUBLICATIONS

Japanese Office Action issued in Japanese Patent Application No. 2006-0105081, dated Nov. 15, 2011.  
Japanese Office Action issued in Japanese Patent Application No. 2006-105081 dated Jul. 10, 2012.

* cited by examiner

*Primary Examiner* — Lihong Yu  
(74) *Attorney, Agent, or Firm* — McDermott Will & Emery LLP

(57) ABSTRACT

A communication apparatus according to the present invention comprises a transmitter for generating and transmitting a data signal where data is superposed as time length of a pulse interval, and a receiver for receiving the data signal. The transmitter and the receiver are connected through a single communication line. The receiver comprises: a receiver-side oscillator circuit for oscillating a reference pulse as a count reference of the data signal; a counter circuit for counting a pulse interval of the received data signal by converting it to a reference pulse number of the oscillator circuit; and a comparator circuit stores a first reference value therein, and judges data of the data signal by comparing the pulse interval of the data signal counted by the counter circuit with the first reference value.

12 Claims, 6 Drawing Sheets

COMMUNICATION APPARATUS

BACKGROUND OF THE INVENTION

1. Field of the Invention

The present invention relates to a communication apparatus that performs communication through a solid-wire communication line.

2. Description of the Related Art

There is a conventional communication apparatus in which data communication is performed through a solid-wire communication line. As a method for judging 0/1 of data at the time of data communication between an interrogator and a responder, such communication apparatus sets a reference time by a delay circuit to judge a voltage change of a signal faster than the reference time as "0", and a voltage change of a signal slower than the reference time as "1", within unit time of data communication. The structure of the conventional communication apparatus will be described hereinafter by referring to the accompanying drawings.

Figure 6A:
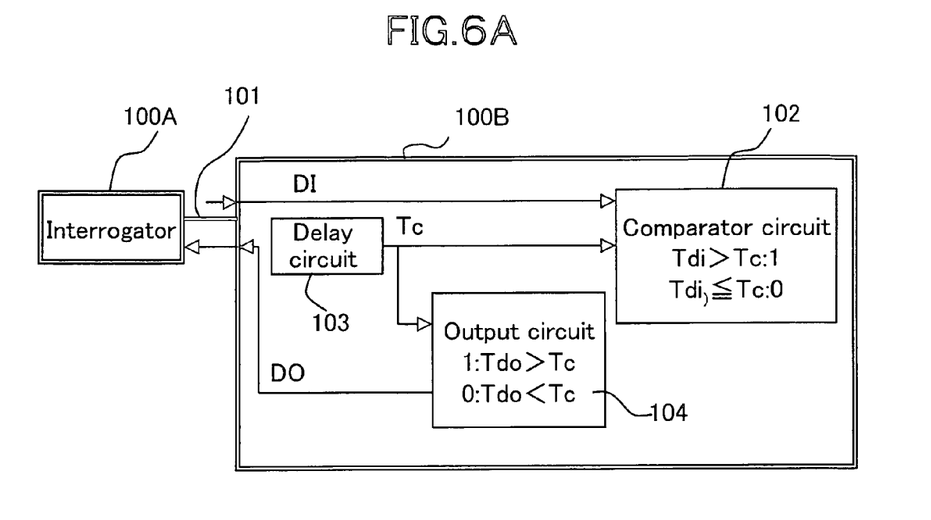
FIG. 6A is a diagram for showing a communication apparatus of a conventional case.

FIG. 6A is a diagram to show the construction of the related art. An interrogator 100A and a responder 100B are connected through a single communication line. The responder 100B comprises a comparator circuit 102, a delay circuit 103, and an output circuit 104. A reference time Tc that is shorter than data communication unit time is set in the delay circuit 103.

Figure 6B:
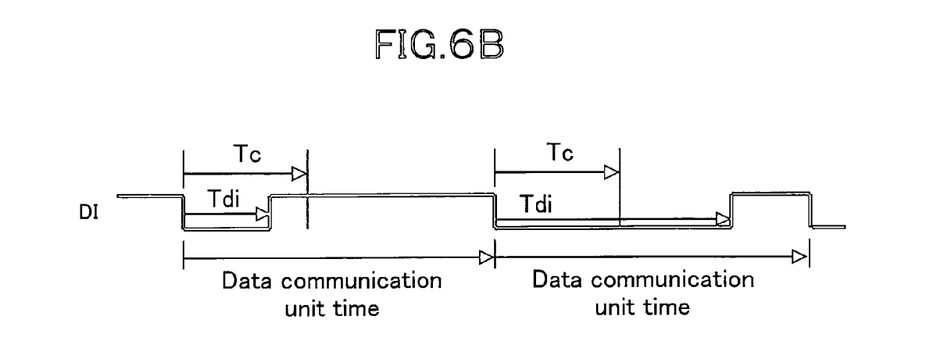
FIG. 6B is a diagram for showing voltage of a communication line when receiving data in the communication apparatus of the conventional case.

First, description is given about the case where the responder 100B receives data. FIG. 6B is a diagram to show a potential of the communication line when the responder 100B receives data in the conventional case. When data is received, the comparator circuit 102 compares voltage change time Tdi of a data signal DI, that is transmitted from the interrogator 100A through the communication line 101 and received by the responder 100B within the data communication unit time, with the reference time Tc set by the delay circuit 103. It is judged as data "0" When voltage change is generated in the data signal DI in a shorter time than the reference time Tc. In the meantime, the data signal DI is judged as data "1" when there is voltage change generated in the data signal DI in a longer time than the reference time Tc.

Figure 6C:
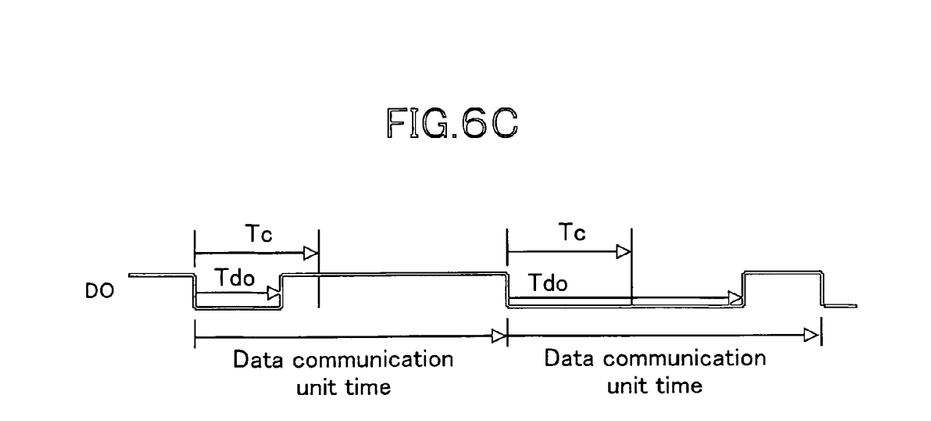
FIG. 6C is a diagram for showing voltage of a communication line when transmitting data from the communication apparatus of the conventional case.

Next, description is given to the case where the responder 100B transmits data to the interrogator 100A. FIG. 6C shows the potential of the communication line 101 at the time of data transmission in the conventional case. With respect to the case of data transmission, the data transmitted from the responder 100B to the interrogator 100A through the communication line 101 within unit time of the data communication is explained dividing into the case "0" and the case "1". When the transmitted data is "0", a voltage change is given by the output circuit 104 to the data signal DO of the communication line 101 at a time Tdo that is shorter than the reference time Tc. In the meantime, when the transmitted data is "1", a voltage change is given by the output circuit 104 to the data signal DO of the communication line 101 at the time Tdo that is longer than the reference time Tc. Due to such voltage changes supplied to the data signal DO, the interrogator 100A can identify the data of the data signal DO. Examples for this type of related art are U.S. Pat. No. 5,210,846 and No. 5,398,326.

However, it is necessary to set the reference time and data communication unit time to be long when the reference time is set to identify the data by the delay circuit 103, under consideration of dispersion of a timing at the data input/output and the reference time due to manufacturing temperature, etc. Thus, it is not possible to perform high-rate communication in this case.

Furthermore, for performing data communication through a solid-wire communication line, the signal to control the responder 100B is treated as the data communication signal and transmitted at the same fixed data length as the data signal. Thus, it is necessary to secure the time to recognize the control signal and, also for that, the total data communication time becomes longer.

SUMMARY OF THE INVENTION

The main object of the present invention therefore is to achieve a data communication at high-rate when data communication is carried out through a solid-wire communication line.

In order to achieve the object, a communication apparatus according the present invention comprises a transmitter for generating and transmitting a data signal that is constituted by superposing data as time length of a pulse interval, and a receiver for receiving the data signal, wherein the transmitter and the receiver are connected through a single communication line, and the receiver comprises: a receiver-side oscillator circuit for oscillating a reference pulse as a count reference of the data signal; a counter circuit for counting a pulse interval of the received data signal by converting it to a reference pulse number of the oscillator circuit; and a comparator circuit to memorize a first reference and judge data of the data signal by comparing the pulse interval of the data signal counted by the counter circuit with the first reference value.

In the present invention comprising the above-described configuration, it is unnecessary to set the data communication unit time when the receiver receives the data, and the pulse interval that is converted with the reference pulse number based on the first reference value becomes the data communication unit time. Thus, when the pulse interval set in this manner is smaller than the first reference value, the data communication unit time becomes short, thereby communication from the interrogator to the receiver can be carried out at a higher rate.

It is preferable for the transmitter to comprise: a transmitter-side oscillator circuit to oscillate a reference pulse as a count reference of the data signal; and an output circuit memorizing the first reference value, generates and outputs the data signal which has a pulse interval that is defined as data based on the first reference value where the pulse interval is set in accordance with count of pulse number of the reference pulse.

According to this, it is unnecessary at the time of transmitting the data signal from the transmitter to set the data communication unit time, and the pulse interval according to the first reference value becomes the data communication unit time. Thus, when the pulse interval is smaller than the first reference value, the data communication unit time becomes short, thereby communication from the interrogator to the receiver can be carried out at a higher rate.

It is preferable for the output circuit to store a second reference value and, after defining, according to the second reference value, a pulse width of two adjacent pulses in the data signal to be a width that shows whether or not the pulse interval between the two pulses indicates data, to generate and output the data signal where the defined pulse width is set based on count number of pulse number of the reference pulse.

With this, it is unnecessary at the time of data transmission by the transmitter to transmit a plurality of data signals such as the control signal and the data signal at a fixed data length, and these data signals can be made recognizable with one pulse. Thereby, data reception by the receiver can be achieved at a high rate. Furthermore, it is unnecessary to synchronize the transmitter and the receiver because there is no data communication unit time. Therefore, it is possible to perform transmission from a single transmitter to a plurality of receiver having different length of communication unit time.

It is preferable for the output circuit to store a reference value of a former pulse of the two pulses and a reference value of a latter pulse as the second reference value, respectively, and then to define a pulse width of the former pulse out of the pulse widths of the two pulses based on the reference value of the former pulse, while defining a pulse width of the latter pulse based on the reference value of the latter pulse.

It is preferable that the counter circuit outputs the pulse interval judged to indicate the data to the comparator circuit wherein the counter circuit stores the second reference value and judges whether or not the pulse interval between the two pulses indicates data through comparing the pulse width between the counted two pulses with the second reference value, after counting the two adjacent pulses in the received data signal by converting it to the reference pulse number of the receiver-side oscillator circuit.

With this, it is unnecessary to communicate a plurality of data signals such as the control signal and the data signal at a fixed data length at reception by the receiver and these data can be recognized with one pulse. Thereby, data reception by the receiver can be achieved at a high-speed. Furthermore, it is unnecessary to synchronize the transmitter and the receiver because there is no data communication unit time. Therefore, it is possible to receive these signals transmitted from a plurality of transmitters having different length of communication unit time by the same receiver.

It is preferable for the counter circuit to store a reference value of a former pulse of the two pulses and a reference value of a latter pulse as the second reference value, respectively, and to judge whether or not the pulse interval between the two pulses indicates the data through comparing a pulse width of the former pulse out of the pulse widths of the counted two pulses with the reference value of the former pulse, and comparing a pulse width of the latter pulse with the reference value of the latter pulse.

It is preferable that the output circuit and the comparator circuit stores a plurality of the first reference values, the output circuit generates and outputs the data signal having the pulse interval defined as data based on the plurality of first reference values, and the comparator circuit judges data of the data signal by comparing the pulse interval of the data signal with the plurality of first reference values.

According to this the receiver is able to receive the data signal containing a plural kinds of data in one pulse, thereby achieving communication from the transmitter to the receiver at a high-speed.

It is preferable for the transmitter to store a third reference value and to generate and output the data signal obtained by setting the defined pulse width according to count of pulse number of the reference pulse, after defining, based on the third reference value, a pulse width of two adjacent pulses in the data signal to be a width that shows whether or not the pulse interval between the two pulses indicates the first reference value.

With this, the first reference value can be set for each transmitter. Therefore, it is possible to set the first reference value and the data communication unit time in a short time regardless of production dispersion of the transmitters, and communication between the transmitter and the receiver can be performed at a high-speed. Furthermore, the first reference value can be changed optionally, so that the data analysis becomes difficult even if there is a leak of the data communicated between the transmitter and the receiver.

It is preferable for the counter circuit to store the third reference value and, to judge whether or not the pulse interval between the two pulses indicates the first reference value through comparing the pulse width between the counted two pulses with the third reference value, and to output the pulse interval being judged as indicating the first reference value to the comparator circuit, after counting the two adjacent pulses in the received data signal by converting it to the reference pulse number of the receiver-side oscillator circuit.

It is preferable for the transmitter to define a pulse width of a front pulse of the outputted data signal as a width indicating the first reference value, and then to generate and output the data signal that is constituted by setting the defined pulse width in accordance with count of pulse number of the reference pulse.

With this, analysis of the data can be made difficult when there is a leak of communication data exchanged between the transmitter and the receiver, since the first reference value is set in one pulse for every data communication. Furthermore, the data communication to set the first reference value can be performed at a high rate.

It is preferable for the counter circuit to count the two adjacent pulses in the received data signal by converting it to the reference pulse number of the receiver-side oscillator circuit, and to output the counted pulse interval of the two pulses to the comparator circuit as the first reference value.

As described above, the present invention is useful as technique for a communication apparatus because a high-speed data communication can be carried out between the transmitter and the receiver in a communication system to communicate data through a single communication line.

BRIEF DESCRIPTION OF THE DRAWINGS

Other objects of the present invention will become clear from the following description of the preferred embodiments and the appended claims. Those skilled in the art will appreciate that there are many other advantages of the present invention by carrying out the present invention.

DETAILED DESCRIPTION OF THE INVENTION

In the followings, the communication apparatuses according to embodiments of the present invention will be described in detail by referring to the accompanying drawings.

First Embodiment

Figure 1A:
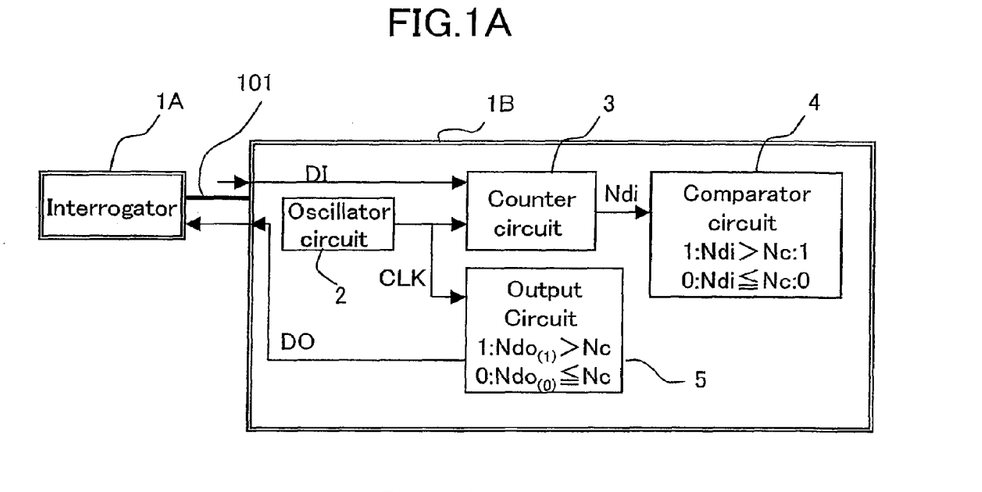
FIG. 1A is a diagram for showing a communication apparatus according to a first embodiment of the present invention.

FIG. 1A is a diagram for showing the structure of a communication apparatus according to a first embodiment of the present invention. The communication apparatus comprises an interrogator 1A and a responder 1B. The interrogator 1A and the responder 1B are connected through a single communication line 101. The responder 1B comprises an oscillator circuit 2, a counter circuit 3, a comparator circuit 4, and an output circuit 5.

The oscillator circuit 2 generates reference pulse CLK. The counter circuit 3 counts pulse number Ndi of the reference pulse CLK. The pulse number Ndi counted by the counter circuit 3 is the following here. Namely, the pulse number Ndi corresponds to the pulse number of the reference pulse CLK that is outputted from the oscillator circuit 2 between a period (pulse interval) of two adjacent pulses among each of the pulses contained in the data signal DI received by the responder 1B. Therefore, the pulse number Ndi indicates the pulse interval.

A first reference value Nc for identifying the data signal DI is stored in the comparator circuit 4 in advance, and the comparator circuit 4 compares the stored first reference value Nc and the pulse number Ndi inputted from the counter circuit 3.

The output circuit 5 generates and outputs the data signal DO that has the pulse interval corresponding to the pulse number Ndo. The pulse number Ndo, like the pulse number Ndi, is the pulse number of the reference pulse CLK that is outputted from the oscillator circuit 2. However, the pulse number Ndi in the counter circuit 3 corresponds to the pulse interval of the received data signal DI, whereas the pulse number Ndo in the output circuit 5 corresponds to the pulse interval of the data signal DO that is transmitted from the output circuit 5, which is set by the output circuit 5.

The output circuit 5 stores the first reference value Nc, and then sets a plurality of pulse numbers Ndo. Specifically, the output circuit 5 sets pulse number $Ndo_{(0)}$ for setting the pulse interval that corresponds to the data "0" and sets pulse number $Ndo_{(1)}$ for setting the pulse interval that corresponds to the data "1". The pulse number $Ndo_{(0)}$ is set as a value equal to or smaller than the first reference value Nc ($Ndo_{(0)} \leq Nc$) while the pulse number $Ndo_{(1)}$ is set as a value larger than the first reference value Nc ($Ndo_{(1)} > Nc$). The output circuit generates and outputs the data signal DO whose pulse interval is set in accordance with the set pulse number Ndo. Further, the output circuit 5 adjusts the voltage of the communication line in accordance with the pulse interval of the data signal DO.

Figure 1B:
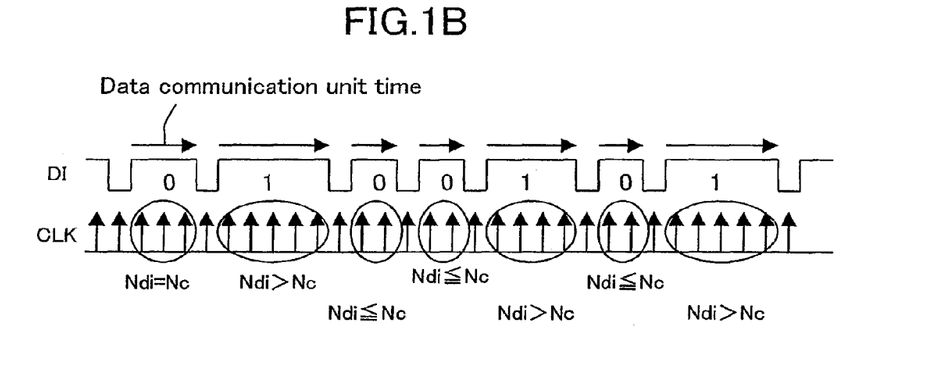
FIG. 1B is a diagram for showing voltage of a communication line when receiving data in the communication apparatus according to the first embodiment.

The action of the first embodiment constituted as mentioned above will be described hereinafter. FIG. 1B shows the voltage of the communication line 101 when the responder 1B receives the data. In this case, the interrogator 1A serves as a transmitter and the responder 1B serves as a receiver. When the responder 1B receives the data signal DI, the pulse number Ndi (pulse interval) of the reference pulse CLK is counted by the counter circuit 3 and supplied to the comparator circuit 4. The comparator 4 compares the stored first reference value Nc with the supplied pulse number Ndi. When it is judged that the pulse number Ndi is equal to or smaller than the first reference value Nc ($Ndi \leq Nc$), the comparator circuit 4 judges that current timing of the data signal DI indicates the data "0". In the meantime, when it is judged that the pulse number Ndi is larger than the first reference value Nc ($Ndi > Nc$), the comparator circuit 4 judges that current timing of the data signal DI indicates the data "1".

Figure 1C:
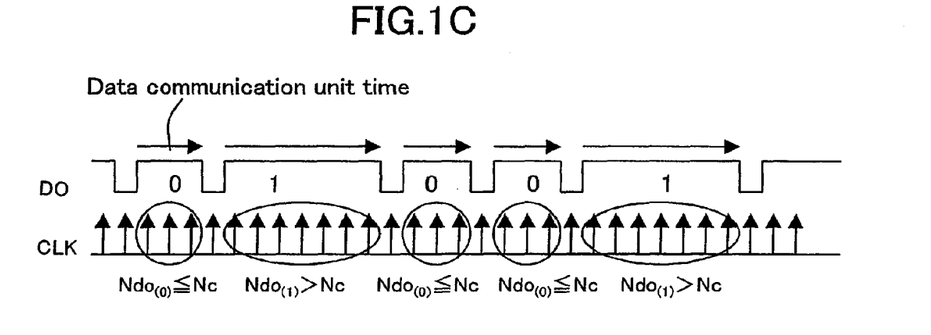
FIG. 1C is a diagram for showing voltage of a communication line when transmitting data from the communication apparatus according to the first embodiment.

FIG. 1C shows the voltage of the communication line 101 when the responder 1B transmits the data signal DO. In this case, the responder 1B serves as the transmitter and the interrogator 1A serves as the receiver. At the time of data-transmission by the responder 1B, the output circuit 5 outputs the data signal DO having the pulse interval that corresponds to the pulse number Ndo of the reference pulse CLK. Further, the output circuit 5 adjusts the potential of the communication line 101 to a value corresponding to the pulse interval of the data signal DO. Specifically, the output circuit 5 sets the value of the pulse number $Ndo_{(0)}$ to meet the range of ($Ndo_{(0)} < Nc$) for the period indicating the data "0" in the data signal DO. In the meantime, for the period indicating the data "1" in the data signal DO, the pulse number $Ndo_{(1)}$ is set as $Ndo_{(1)} > Nc$. The output circuit 5 generates the data signal DO having the pulse interval according to the set pulse numbers Ndo. Furthermore, the output circuit 5 adjusts the voltage of the communication line 101 in accordance with the pulse interval of the data signal DO and transmits the generated data signal DO to the interrogator 1A through the communication line 101.

With the embodiment as described above, it is not necessary to set the data communication unit time when the responder 1B receives the data signal DI from the interrogator 1A in the communication apparatus through a solid-wire communication line 101, and the pulse interval corresponding to the reference pulse Ndi for identifying the data signal DI serves as the data communication unit time. Thus, when the pulse number Ndi counted from the data signal DI is smaller than the first reference value Nc, the data communication unit time becomes short, thereby reception processing can be carried out at the high-speed.

Moreover, when the responder 1B transmits the data signal DO to the interrogator 1A, the pulse interval corresponding to the pulse number Ndo becomes the data communication unit time. Thus, when the pulse number Ndo is smaller than the first reference value Nc for identifying the data signal DO, the data communication unit time becomes short, thereby transmission processing can be carried out at the high-speed.

Second Embodiment

Figure 2A:
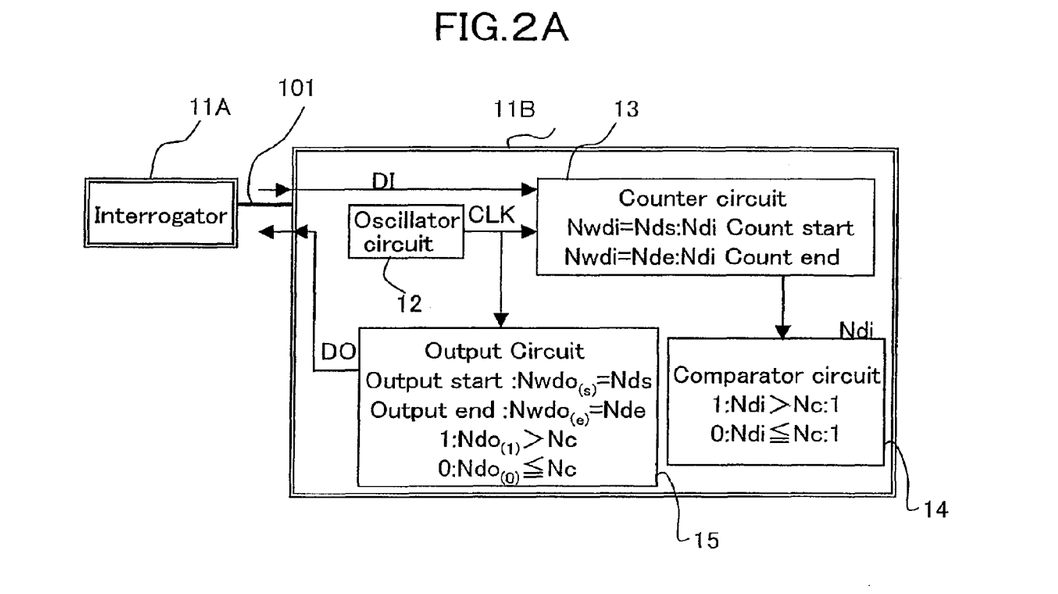
FIG. 2A is a diagram for showing a communication apparatus according to a second embodiment of the present invention.

FIG. 2A is a diagram for showing the structure of a communication apparatus according to a second embodiment of the present invention. The communication apparatus comprises an interrogator 11A and a responder 11B. The interrogator 11A and the responder 11B are connected through a single communication line 101. The responder 11B comprises an oscillator circuit 12, a counter circuit 13, a comparator circuit 14, and an output circuit 15.

The oscillator circuit 12 generates reference pulse CLK. The counter circuit 13 counts the pulse number Ndi of the reference pulse CLK. The counter circuit 13 further counts the pulse number Nwdi of the reference pulse to make the reference points (count start point and count end point) for counting the pulse number Ndi. The pulse number Ndi is the same as that described in the first embodiment. In the meantime, the pulse number Nwdi corresponds to the pulse number of the reference pulse CLK that is outputted from the oscillator circuit 12 during the output period (pulse width) of each pulse contained in the data signal DI received by the responder 11B. Further, the counter circuit 13 stores a count start reference value Nds and a count end reference value Nde. The count start reference value Nds is a reference data for identifying the count start point when counting the pulse number Ndi, while the count end reference value Nde is a reference data for identifying the count end point when counting the pulse number Ndi. The count start reference value Nds and the count end reference value Nde are the second reference values. The count start reference value Nds is the former pulse reference value and the count end reference value Nde is the latter pulse reference value.

The first reference value Nc for identifying the data signal DI is stored in the comparator circuit 14 in advance, and the comparator circuit 14 compares the stored first reference value Nc with the pulse number Ndi inputted from the counter circuit 13. The structure of the comparator circuit 14 is the same as the comparator circuit 4 of the first embodiment.

The output circuit 15 stores the count start reference value Nds and the count end reference value Nde in advance, and sets a plurality of pulse numbers Ndo and pulse numbers Nwdo, respectively. Specifically, the output circuit 15 sets the pulse number $Ndo_{(0)}$ and the pulse number $Ndo_{(1)}$ as the pulse numbers Ndo. The pulse number $Ndo_{(0)}$ and the pulse number $Ndo_{(1)}$ are the same as described in the first embodiment. The output circuit 15 sets the pulse number $Nwdo_{(s)}$ and the pulse number $Nwdo_{(s)}$ as the pulse numbers Nwdo. The pulse number $Nwdo_{(s)}$ is set to be the same as the count start reference value Nds ($Nwdo_{(s)}$=Nds), and the pulse number $Nwdo_{(e)}$ is set to be the same as the count end reference value Nde ($Nwdo_{(e)}$=Nde) The output circuit 15 sets the pulse interval in accordance with the set pulse number Nwdo, and generates and outputs the data signal DO whose pulse width is set in accordance with the set pulse number Nwdo. Furthermore, the output circuit 15 adjusts the voltage of the communication line 101 according to the pulse width and the pulse interval of the data signal DO.

Figure 2B:
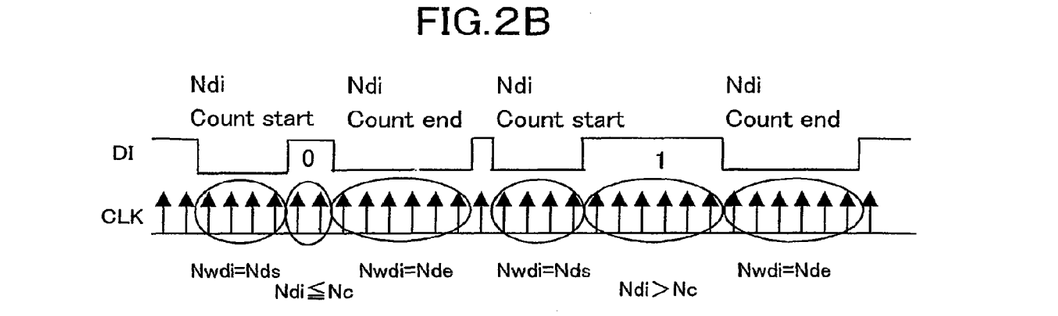
FIG. 2B is a diagram for showing voltage of a communication line when receiving data in the communication apparatus according to the second embodiment.

The action of the second embodiment constructed as described above will be described hereinafter. FIG. 2B shows the voltage of the communication line 101 when the responder 11B receives data signal DI. In this case, the interrogator 11A serves as a transmitter and the responder 11B serves as a receiver.

When receiving the data, the counter circuit 13 of the responder 11B counts the pulse number Nwdi and the pulse number Ndi of the reference pulse CLK. As described above, the pulse numbers Nwdi and Ndi correspond to the pulse width and the pulse interval of the data signal DI transmitted from the interrogator 11A through the communication line 101.

When counting the above-described pulse numbers, the counter circuit 13 counts the pulse number Nwdi (pulse width) first. When the counted pulse number Ndi is equal to the count start reference value Nds (Nwdi=Nds), the counter circuit 13 judges that it has reached the timing for starting the count of the pulse number Ndi (pulse interval), and start counting the pulse number of the reference pulse CLK in the next pulse interval as the pulse number Ndi. After completing the count of the pulse number Ndi in that pulse interval, the counter circuit 13 counts the pulse number Nwdi (pulse width) in the next pulse. When the counted pulse number Nwdi matches the count end reference value Nde (Nwdi=Nde), the counter circuit 13 judges that the count of the pulse number Ndi (pulse interval) performed just before has ended without any troubles, and outputs the counted result (Ndi) to the comparator circuit 14.

The comparator circuit 14 compares the inputted pulse number Ndi (pulse interval of the data signal DI) with the first reference value Nc stored in advance. When it is judged that the pulse number Ndi is equal to or smaller than the first reference value Nc (Ndi≦Nc), the comparator circuit 14 judges that current timing of the data signal DI indicates the data "0". In the meantime, when it is judged that the pulse number Ndi is larger than the first reference value Nc (Ndi>Nc), the comparator circuit 14 judges that current timing of the data signal DI indicates the data "1". The action of the comparator circuit 14 is basically the same as that of the first embodiment.

Figure 2C:
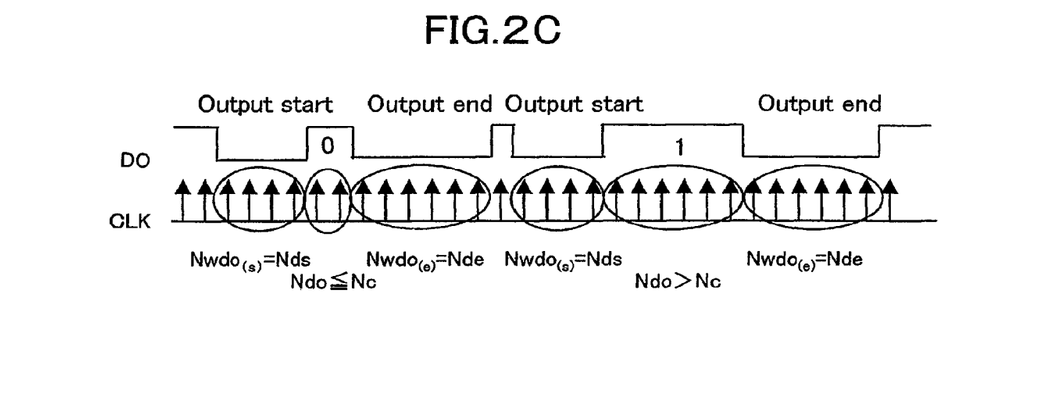
FIG. 2C is a diagram for showing voltage of a communication line when transmitting data from the communication apparatus according to the second embodiment.

FIG. 2C shows the voltage of the communication line 101 when the responder 11B transmits the data signal DO. In this case, the responder 11B serves as the transmitter and the interrogator 11A serves as the receiver.

When transmitting the data, the output circuit 15 generates the data signal DO that is constituted with the pulse having the pulse width corresponding to the pulse number $Nwdo_{(s)}$ (=Nds) and the pulse having the pulse width corresponding to the pulse number $Nwdo_{(e)}$ (=Nde) in a state of arrangement adjacent to each other. Furthermore, the output circuit 15 sets the pulse interval corresponding to the pulse number $Ndo_{(1)}$ or the pulse interval corresponding to the pulse number $Ndo_{(0)}$ between the adjacent pulses in the data signal DO generated. Furthermore, the output circuit 15 adjusts the voltage of the communication line 101 according to the pulse width and the pulse interval of the data signal DO.

In the second embodiment, the pulse number $Ndo_{(0)}$ of the reference pulse CLK is set to be equal to or smaller than the first reference value Nc ($Ndo_{(0)}$≦Nc) at the timing where the data signal DO indicates "0", and the pulse number $Ndo_{(1)}$ of the reference pulse CLK is set to be larger than the first reference value Nc ($Ndo_{(1)}$>Nc) at the timing where the data signal DO indicates "1". The output circuit 15 generates the data signal DO in accordance with such pulse numbers Ndo, and then outputs the generated data signal DO to the interrogator 11A through the communication line 101. Furthermore, the output circuit 15 adjusts the voltage of the communication line 101 according to the pulse width and the pulse interval of the data signal DO.

With the second embodiment as described above, it is not necessary to communicate the control signal and the data signal at the fixed data lengths and a plural kinds of the signals can be recognized in one pulse, when the responder 11B receives the data signal DI transmitted from the interrogator 11A. Therefore, the responder 11B can receive the transmission data of the interrogator 11A at a high-speed. Furthermore, it is unnecessary to synchronize the interrogator 11A and the responder 11B because there is no data communication unit time. Thus, the data signals DO transmitted from a plurality of interrogators 11A with different communication unit time can be received by the same responder 11B. Furthermore, since there is no data communication unit time, it is not necessary to synchronize the interrogator 11A and the responder 11B either when transmitting the data from the responder 11B to the interrogator 11A. Therefore, it is possible to transmit the data signal from the same responder 11B to a plurality of interrogators 11A with different communication unit time.

Third Embodiment

Figure 3A:
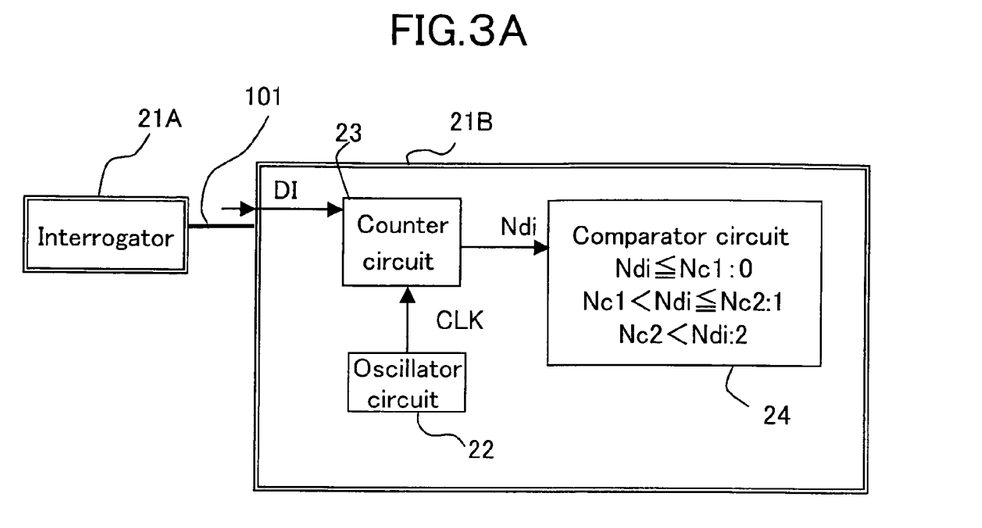
FIG. 3A is a diagram for showing a communication apparatus according to a third embodiment of the present invention.

FIG. 3A is a diagram for showing the structure of a communication apparatus according to a third embodiment of the present invention. The communication apparatus comprises an interrogator 21A and a responder 21B. The interrogator 21A and the responder 21B are connected through a single communication line 101. The responder 21B comprises an oscillator circuit 22, a counter circuit 23, and a comparator circuit 24. The oscillator circuit 22 generates reference pulse CLK. The counter circuit 23 counts the pulse number Ndi of the reference pulse CLK. The pulse number Ndi is the same as those described in the first and second embodiments. The comparator circuit 24 stores reference value Nc1 and Nc2 as the first reference values for identifying the data signal DI, and compares the stored reference values Nc1 and Nc2 with the pulse number Ndi inputted from the counter circuit 23. The reference value Nc1 is a threshold value for distinguishing the data "0" and data "1", and the reference value Nc2 is a threshold value for distinguishing the data "1" and data "2". These reference values Nc1 and Nc2 have the large and small relationship of Nc1<Nc2. The third embodiment has a feature that the comparator has a plurality (in this case, two as example) of reference values Nc1 and Nc2 as the first reference values.

Figure 3B:
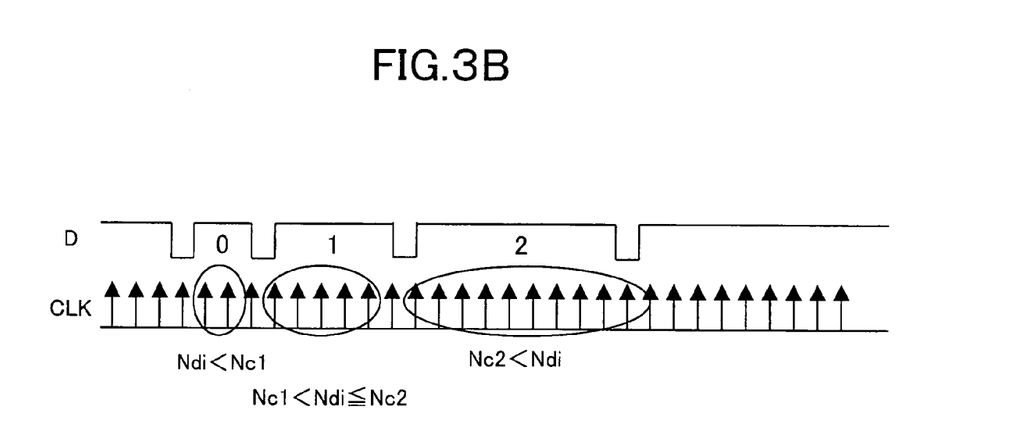
FIG. 3B is a diagram for showing voltage of a communication line when receiving data in the communication apparatus according to the third embodiment.

The action of the third embodiment constituted as mentoned above will be described hereinafter. FIG. 3B shows the voltage of the communication line 101 when the responder 21B according to the third embodiment of the present invention receives the data signal DI. In this case, the interrogator 21A serves as a transmitter and the responder 21B serves as a receiver.

When receiving the data signal DI, the counter circuit 23 counts the pulse number Ndi of the reference pulse CLK. The comparator circuit 24 compares the pulse number Ndi of the reference pulse CLK with the reference values Nc1 and Nc2. When the pulse number Ndi is equal to or smaller than the reference value Nc1 (Ndi≦Nc1), the comparator circuit 24 judges that the current timing of the data signal DI indicates the data "0". When the pulse number Ndi is larger than the reference value Nc1, and equal to or smaller than the reference value Nc2 (Nc1<Ndi≦Nc2), the comparator circuit 24 judges that the current timing of the data signal DI indicates he data "1". The comparator circuit 24 compares the pulse Ndi with the reference values Nc1 and Nc2, and judges that the current timing of the data signal DI indicates the data "2" when the pulse number Ndi is larger than the reference value Nc2 (Nc2<Ndi).

With the third embodiment as described above, it is possible for the responder 21B to receive the data signal DI in which a plural kinds of data ("0", "1", "2", etc.) are superposed, as a result, the rate of transmitting the data signal DI from the interrogator 21A to the responder 21B can be made much faster.

Fourth Embodiment

Figure 4A:
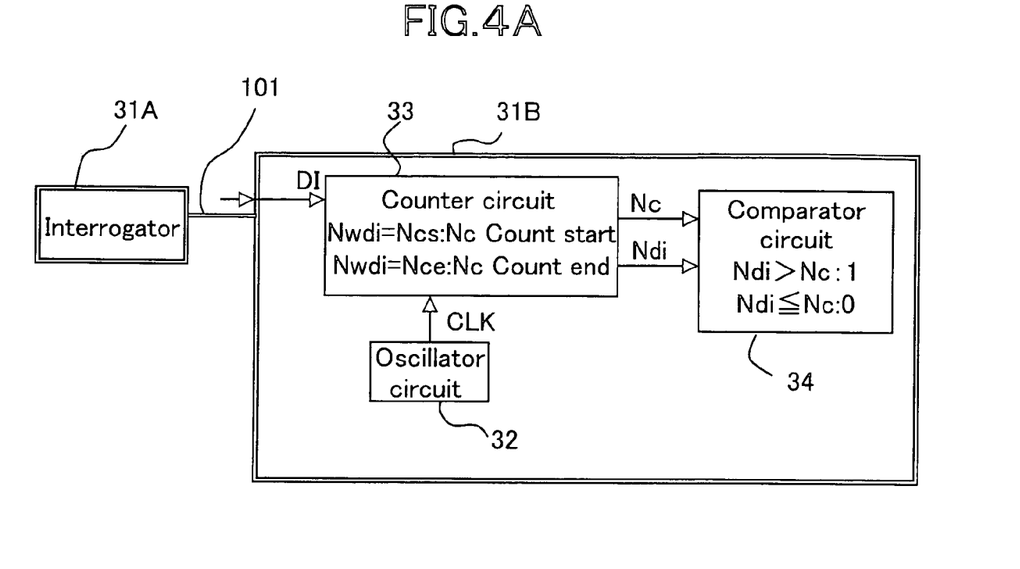
FIG. 4A is a diagram for showing a communication apparatus according to a fourth embodiment of the present invention.

FIG. 4A is a diagram for showing the structure of a communication apparatus according to a fourth embodiment of the present invention. The communication apparatus comprises an interrogator 31A and a responder 31B. The interrogator 31A and the responder 31B are connected through a single communication line 101. The responder 31B comprises an oscillator circuit 32, a counter circuit 33, and a comparator circuit 34.

The oscillator circuit 32 generates reference pulse CLK. The counter circuit 33 counts the pulse number Ndi of the reference pulse CLK. The counter circuit 33 counts the pulse number Ndi of the reference pulse as well as the pulse number Nwdi of the reference pulse. The pulse number Ndi and the pulse number Nwdi are the same as those described in the second embodiment. Furthermore, the counter circuit 33 stores a count start reference value Ncs and a count end reference value Nce. The count start reference value Ncs is a third reference value for identifying the count start point when counting the pulse number Ndi. The count end reference value Nce is a third reference value for identifying the count end point when counting the pulse number Ndi. The counter circuit 33 outputs the pulse number Ndi and the first reference value Nc to the comparator circuit 34.

In the fourth embodiment, the pulse number Ndi counted based on the count start reference value Ncs and the count end reference point Nce does not indicate the data such as "0", "1", etc., but indicate the data of the first reference value Nc. There is a feature in the fourth embodiment at this point.

The comparator circuit 34 compares the first reference value Nc inputted from the counter circuit 33 with the pulse number Ndi. The structure of the comparator circuit 34 is the same as that of the comparator circuit 4 of the first embodiment.

The action of the fourth embodiment constituted as mentioned above will be described hereinafter. The description is given to the case here where the data signal is transmitted from the interrogator 31A to the responder 31B. In this case, the interrogator 31A serves as a transmitter and the responder 31B serves as a receiver.

The interrogator 31A superposes the first reference value Nc, the count start reference value Ncs, and the count end reference value Nce, for example, at the front position of the data, as the data signal DI. Specifically, the interrogator 31A sets the each pulse width of two adjacent pulses in the front position of the data as the pulse widths indicating the count start reference value Ncs and the count end reference value Nce, respectively, while setting the pulse interval between the adjacent pulses to be the pulse interval indicating the first reference value Nc. In the description below it is provided as an assumption that the data signal DI having signal processing performed as described above is transmitted from the interrogator 31A to the responder 31B. However, the position of superposing the first reference value Nc and the like is not limited to the front position of the data but may be optionally at any positions.

Figure 4B:
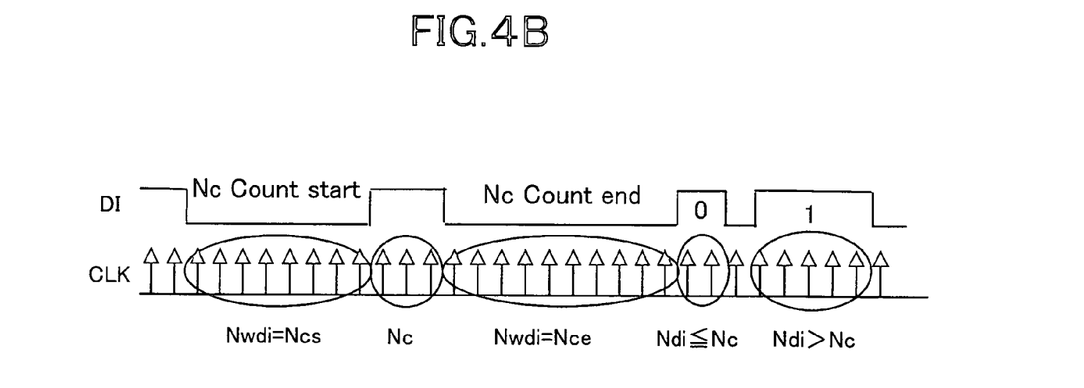
FIG. 4B is a diagram for showing voltage of a communication line when receiving data in the communication apparatus according to the fourth embodiment.

FIG. 4B is a diagram for showing the voltage of the communication line 101 when the responder 31B receives the data signal DI. When receiving the data, the counter circuit 33 counts the pulse number Nwdi and the pulse number Ndi of the reference pulse CLK. As described above, the pulse numbers Nwdi and Ndi correspond to the pulse width and the pulse interval of the data signal DI that is received from the interrogator 31A through the communication line 101.

On the occasion of counting the pulse numbers described above, the counter circuit 33 counts the pulse number Nwdi (pulse width) first. When the counted pulse number Nwdi is equal to the count start pulse number Ncs for identifying the data (Nwdi=Ncs), the counter circuit 33 judges that it has reached the timing to start the count of the pulse number Ndi indicating the first reference value, thereby starting the count of the pulse number Ndi of the reference pulse CLK in the next pulse interval. After completing count of the pulse number Ndi, the counter circuit 33 counts the pulse number Nwdi in the next pulse width. When the counted pulse number Nwdi matches the count end reference value Nce (Nwdi=Nce), the counter circuit 33 judges that the pulse number in the pulse interval measured just before is the pulse number Ndi, and outputs the counted result (Ndi) to the comparator circuit 34 as the first reference value Nc. The comparator circuit 34 memorizes the inputted first reference value Nc (the pulse number Ndi).

After completing the above-described preparation, further, the counter circuit 33 starts the count of the pulse number Ndi indicating the data, and outputs the counted pulse number Ndi to the comparator circuit 34. The comparator circuit 34 compares the stored first reference value Nc with the pulse number Ndi. When it is judged that the pulse number Ndi is equal to or smaller than the first reference value Nc (Ndi≦Nc), the comparator circuit 34 passes a judgment of the current timing of the received data signal DI as the data "0". In the meantime, when it is judged that the pulse number Ndi is larger than the first reference value Nc (Ndi>Nc), the comparator circuit 34 passes a judgment of the current timing of the received data signal DI as the data "1". The action of the comparator circuit 34 is basically the same as that of the first embodiment.

According to the fourth embodiment as described above, it is possible to set the first reference value Nc for identifying the data as the separate reference value numbers for each responder 31B. Thus, the first reference value Nc for identifying the data and the data communication unit time can be set in a short time regardless of the production dispersion on the responders 31B. For the above advantage, the communication between the interrogator 31A and the responder 31B can be carried out at a high-speed. Furthermore, as the first reference value Nc for identifying the data can be changed optionally, the data analysis becomes difficult even if there is a leak of the communication data.

In the description above, the position for superposing the first reference value Nc on the data signal DI is explained as the data front position. However, the superposing position is not limited to the data front position but can be set at any data positions. Upon input of the first reference value Nc, the comparator circuit 34 updates the stored first reference value Nc, and identifies the data signal according to the updated first reference value Nc thereafter.

Fifth Embodiment

Figure 5A:
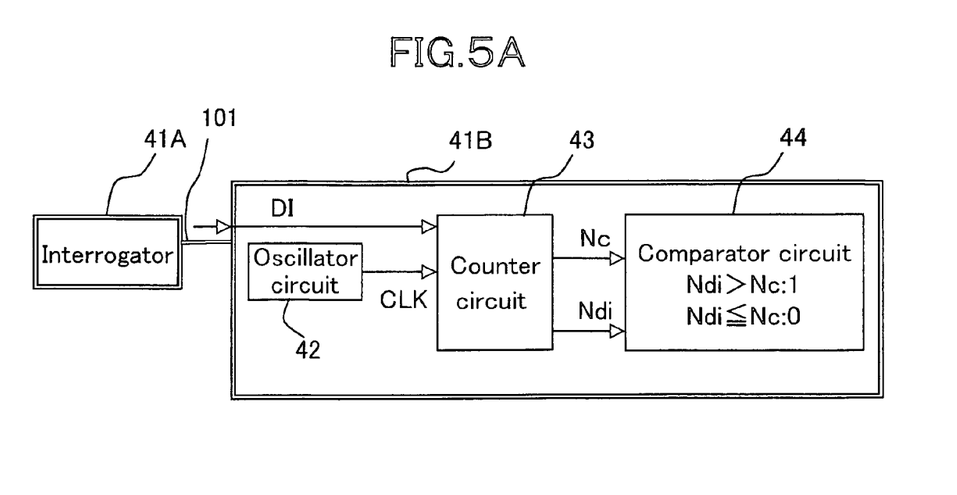
FIG. 5A is a diagram for showing a communication apparatus according to a fifth embodiment of the present invention.

FIG. 5A is a diagram for showing the structure of a communication apparatus according to a fifth embodiment of the present invention. The communication apparatus comprises an interrogator 41A and a responder 41B. The interrogator 41A and the responder 41B are connected through a single communication line 101. The responder 41B comprises an oscillator circuit 42, a counter circuit 43, and a comparator circuit 44. These structures are basically the same as those of the fourth embodiment. However, the fifth embodiment is different from the fourth embodiment in the structure to capture the first reference value Nc by the responder 41B.

The action of the fifth embodiment will be described hereinafter. The case will be described here where the data signal DI is communicated from the interrogator 41A to the responder 41B. In this case, the interrogator 41A serves as a transmitter and the responder 41B serves as a receiver.

The interrogator 41A transmitting the data signal DI superposes the first reference value Nc upon the front position of the data as the data signal DI. Specifically, the interrogator 41A sets the pulse width of the pulses at the front position of the data to be the pulse width that indicates the first reference value Nc. An assumption is provided in the description below that the data signal DI made the above-described signal processing is transmitted from the interrogator 41A to the responder 41B.

Figure 5B:
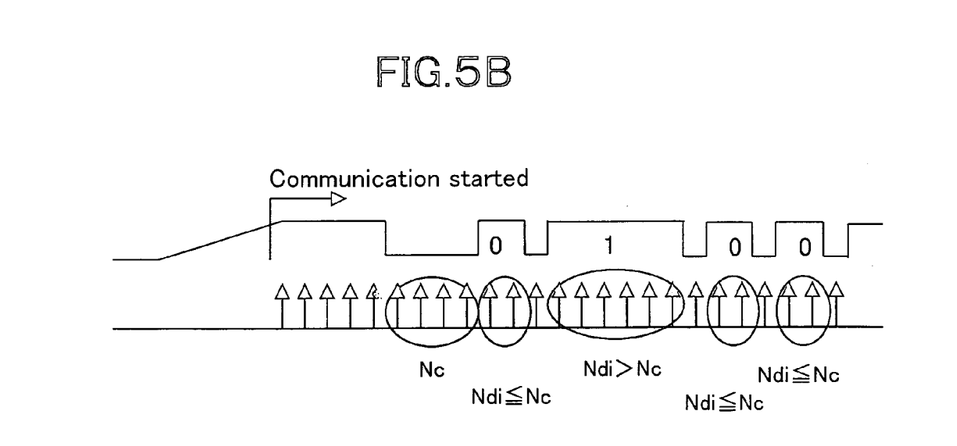
FIG. 5B is a diagram for showing voltage of a communication line when receiving data in the communication apparatus according to the fifth embodiment.

FIG. 5B is a diagram for showing the voltage of the communication line 101 when the responder 41B receives the data signal DI. When receiving the data, the counter circuit 43 counts the pulse number Nwdi and the pulse number Ndi of the reference pulse CLK. As described above, the pulse numbers Nwdi and Ndi correspond to the pulse width and the pulse interval of the data signal DI that is transmitted from the interrogator 41A through the communication line 101.

On the occasion of counting pulse numbers mentioned above, the counter circuit 43 counts the pulse number Nwdi (pulse width) at the signal front position first, and outputs the counted pulse number Nwdi to the comparator circuit 44 as the first reference value Nc. The comparator circuit 44 stores the inputted first reference value Nc (pulse number Nwdi).

After completing the above-described preparation, further, the counter circuit 43 starts the count of the pulse number Ndi indicating the data ("0", "1", etc.), and outputs the counted pulse number Ndi to the comparator circuit 44. The comparator circuit 44 compares the stored first reference value Nc with the pulse number Ndi. When it is judged that the pulse number Ndi is equal to or smaller than the first reference value Nc (Ndi≦Nc), the comparator circuit 44 passes judgment of the current timing of the received data signal DI as the data "0". In the meantime, when it is judged that the pulse number Ndi is larger than the first reference value Nc (Ndi>Nc), the comparator circuit 44 passes judgment of the current timing of the received data signal DI as the data "1". The action of the comparator circuit 34 is basically the same as that of the first embodiment.

According to the fifth embodiment as described above, the first reference value Nc is set as one pulse for every data communication, thereby making it difficult to analyze the data even if there is a leak of the communication data. Moreover, the data communication to set the first reference value Nc can be performed at a high-speed.

The present invention has been described in detail by referring to the most preferred embodiments. However, various combinations and modifications of the components are possible without departing from the sprit and the broad scope of the appended claims.

What is claimed is:

1. A communication apparatus, comprising
a transmitter for generating and transmitting a data signal having a variable cycle of a high pulse interval and a low pulse interval, wherein data is superposed as time length of a pulse interval, and
a receiver for receiving said data signal, said transmitter and said receiver are connected through a single communication line, wherein
said receiver comprises:
a receiver-side oscillator circuit for oscillating a reference pulse as a count reference of said data signal;
a counter circuit for counting said high pulse interval of said received data signal by converting it to a reference pulse number of said oscillator circuit, wherein said counter circuit does not count said low pulse interval of said received data signal; and
a comparator circuit to judge whether a value of said data signal is 0 or 1 by comparing said high pulse interval of said data signal counted by said counter circuit with a first reference value, and said transmitter comprises:
- a transmitter-side oscillator circuit for oscillating a reference pulse as a count reference of said data signal; and
- an output circuit to generate and output said data signal with a pulse interval that is defined as data based on said first reference value, wherein said pulse interval is set based on count of pulse number of said reference pulse.

2. The communication apparatus according to claim 1, wherein said output circuit generates and outputs said data signal where said pulse width defined is set based on count of pulse number of said reference pulse, after defining a pulse interval of two adjacent pulses in said data signal to be a width that shows whether or not a pulse interval between said two pulses indicates data according to a second reference value.

3. The communication apparatus according to claim 2, wherein said second reference value is a reference value of a former pulse of said two pulses and a reference value of a latter pulse, and then defines a pulse width of said former pulse according to said reference value of said former pulse, while defining a pulse width of said latter pulse according to said reference value of said latter pulse, out of said pulse widths of said two pulses.

4. The communication apparatus according to claim 2, wherein said counter circuit outputs a said pulse to said comparator circuit after counting said two adjacent pulses in said received data signal by converting it to said reference pulse number of said receiver-side oscillator circuit, judging whether or not said pulse interval between said two pulses indicates data by comparing said pulse width between said counted two pulses with said second reference value, and being judged to indicate data.

5. The communication apparatus according to claim 4, wherein said second reference value is a reference value of a former pulse and a reference value of a latter pulse, and judges whether or not said pulse interval between said two pulses indicates data by comparing a pulse width of said former pulse with said reference value of said former pulse, and comparing a pulse width of said latter pulse with said reference value of said latter pulse out of said pulse widths of said counted two pulses.

6. The communication apparatus according to claim 1, wherein:
- said output circuit generates and outputs said data signal having said pulse interval that is defined as data based on a plurality of first reference values; and
- said comparator circuit judges data of said data signal by comparing said pulse interval of said data signal with said plurality of first reference values.

7. The communication apparatus according to claim 1, wherein said transmitter generates and outputs said data signal where said defined pulse interval is set based on count of pulse number of said reference pulse, after defining a pulse width of two adjacent pulses to be a width that shows whether or not said pulse interval between said two pulses indicates said first reference value according to a third reference value.

8. The communication apparatus according to claim 7, wherein said counter circuit outputs said pulse interval judged to indicate said first reference value to said comparator circuit, after counting said two adjacent pulses in said received data signal by converting it to said reference pulse number of said receiver-side oscillator circuit, and judging whether or not said pulse interval between said two pulses indicates said first reference value by comparing said pulse width between said counted two pulses with said third reference value.

9. The communication apparatus according to claim 1, wherein said transmitter defines a pulse width of a front pulse of said data signal to be outputted as a width indicating said first reference value, and then generates and outputs said data signal where said defined pulse width is set based on count of pulse number of said reference pulse.

10. The communication apparatus according to claim 9, wherein said counter circuit counts said pulse interval of two adjacent pulses in said received data signal by converting it to said reference pulse number of said receiver-side oscillator circuit, and outputs said counted pulse interval of said two pulses to said comparator circuit as said first reference value.

11. A communication apparatus, comprising:
- a transmitter and a receiver connected through a single communication line, and said single communication line transmits a data signal having a variable cycle of a high pulse interval and a low pulse interval, wherein data is superposed as time length of a pulse interval, and
- said receiver comprises:
  - an oscillator circuit for oscillating a reference pulse as a count reference of said data signal;
  - a counter circuit for counting said high pulse interval of said data signal by converting it to a reference pulse number of said oscillator circuit, wherein said counter circuit does not count said low pulse interval of said received data signal;
  - a comparator circuit to judge whether a value of said data signal is 0 or 1 by comparing said high pulse interval of said data signal counted by said counter circuit with a first reference value, and
  - an output circuit to generate and output said data signal with a pulse interval that is defined as data based on said first reference value, wherein said pulse interval is set based on count of pulse number of said reference pulse.

12. A receiver for receiving a data signal wherein data is superposed as time length of a pulse interval through a single communication line, comprising:
- an oscillator circuit for oscillating a reference pulse as a count reference of said data signal, said data signal having a variable cycle of a high pulse interval and a low pulse interval;
- a counter circuit for counting said high pulse interval of said data signal by converting it to a reference pulse number of said oscillator circuit, wherein said counter circuit does not count said low pulse interval of said received data signal;
- a comparator circuit to judge whether a value of said data signal is 0 or 1 by comparing said high pulse interval of interval of said data signal counted by said counter circuit with a first reference value, and
- an output circuit to generate and output said data signal with a pulse interval that is defined as data based on said first reference value,
- wherein said pulse interval is set based on count of pulse number of said reference pulse.

* * * * *